United States Patent
Gu et al.

(10) Patent No.: US 10,808,818 B2
(45) Date of Patent: Oct. 20, 2020

(54) OSCILLATING POWER TOOL

(71) Applicant: Positec Power Tools (Suzhou) Co., Ltd., Suzhou, Jiangsu (CN)

(72) Inventors: Hua Gu, Suzhou (CN); Tianhong Ju, Suzhou (CN); Gangliang Cheng, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 162 days.

(21) Appl. No.: 16/045,836

(22) Filed: Jul. 26, 2018

(65) Prior Publication Data
US 2018/0335118 A1 Nov. 22, 2018

Related U.S. Application Data

(63) Continuation of application No. PCT/CN2017/071393, filed on Jan. 17, 2017.

(30) Foreign Application Priority Data

Jan. 27, 2016 (CN) .......................... 2016 1 0055431

(51) Int. Cl.
*B23D 45/16* (2006.01)
*F16H 37/12* (2006.01)
(Continued)

(52) U.S. Cl.
CPC ........... *F16H 37/122* (2013.01); *B23B 31/06* (2013.01); *B25F 3/00* (2013.01); *B25F 5/001* (2013.01); *B25F 5/02* (2013.01); *H02K 7/075* (2013.01); *H02K 7/145* (2013.01); *B23D 45/16* (2013.01); *B23D 51/10* (2013.01); *B24B 23/04* (2013.01)

(58) Field of Classification Search
CPC ...... B23D 51/16; B27B 17/006; F16H 37/122
(Continued)

(56) References Cited

U.S. PATENT DOCUMENTS 5,637,034 A   6/1997 Everts et al.
5,768,933 A   6/1998 Tanner et al.
(Continued)

FOREIGN PATENT DOCUMENTS

CN   102441873   5/2012
CN   203993814   12/2014
(Continued)

OTHER PUBLICATIONS

State Intellectual Property Office of the P.R. China, International Search Report for PCT/CN2017/071393 dated Mar. 15, 2017 (English Translation included).

*Primary Examiner* — Nathaniel C Chukwurah
(74) *Attorney, Agent, or Firm* — Middleton Reutlinger

(57) ABSTRACT

An oscillating power tool, including a housing; a motor; a drive shaft driven by the motor; an output shaft driven by the drive shaft; a transmission mechanism for converting rotary motion of the drive shaft into oscillation of the output shaft, wherein the transmission mechanism includes an eccentric device mounted on the drive shaft and a shifting fork assembly connecting the eccentric device with the output shaft; the eccentric device includes at least two drive members, the shifting fork assembly includes a shifting fork member connected to the output shaft and a supporting member movably connected to the shifting fork member, the supporting member includes a matching portion, the oscillating power tool further includes an adjusting mechanism disposed in the housing, and the adjusting mechanism operably adjusts the supporting member to move, such that the matching portion is selectively abutted against different drive members.

18 Claims, 11 Drawing Sheets

(51) Int. Cl.
*B25F 5/00* (2006.01)
*H02K 7/075* (2006.01)
*H02K 7/14* (2006.01)
*B23B 31/06* (2006.01)
*B25F 3/00* (2006.01)
*B25F 5/02* (2006.01)
*B23D 51/10* (2006.01)
*B24B 23/04* (2006.01)

(58) Field of Classification Search
USPC .......................................................... 173/148
See application file for complete search history.

(56) References Cited

U.S. PATENT DOCUMENTS

| | | | |
|---|---|---|---|
| 7,108,077 | B2 | 9/2006 | Zaiser |
| 10,213,852 | B2 * | 2/2019 | Qian ........................ B24B 27/08 |
| 2012/0067607 | A1 | 3/2012 | Weber et al. |
| 2014/0020918 | A1 * | 1/2014 | Klabunde .............. B23D 47/12 173/49 |
| 2014/0123785 | A1 | 5/2014 | Sumi et al. |
| 2016/0271711 | A1 | 9/2016 | Qian et al. |

FOREIGN PATENT DOCUMENTS

| | | |
|---|---|---|
| CN | 104669217 | 6/2015 |
| CN | 104669218 | 6/2015 |
| CN | 105690330 | 6/2016 |
| CN | 205552453 | 9/2016 |
| EP | 2594364 | 6/2014 |
| EP | 2688714 | 6/2015 |
| JP | 54106891 | 8/1979 |
| WO | 2015078386 | 6/2015 |
| WO | 2017128993 | 8/2017 |

* cited by examiner

OSCILLATING POWER TOOL

BACKGROUND

Technical Field

The present invention relates to a power tool, in particular to a handheld oscillating power tool.

Related Art

The multifunctional machine is a common oscillating power tool in the industry, and its working principle is that an output shaft performs oscillating motion around an axis per se. Therefore, when a user mounts different working heads such as a straight saw blade, a circular saw blade, a triangular sanding disc and a shovel-shaped scraper on a free end of the output shaft, multiple different operation functions such as sawing, cutting, grinding, scraping, etc., can be realized, so as to adapt to different working requirements.

Specifically referring to FIGS. 1 and 2, the existing oscillating power tool 100' comprises an housing 1', an output shaft 2' extending out from the housing 1', a motor 11' disposed in the housing 1' and a main shaft 4' driven by the motor 11'. One end of the main shaft 4' is connected to an eccentric shaft 41' deviated from an axis Y of the main shaft, and the eccentric shaft 41' is provided with a bearing 8' having a spherical outer surface 81'. A shifting fork 7' is disposed between the main shaft 4' and the output shaft 2', one end of the shifting fork 7' is pivotally connected to the output shaft 2' and a pair of arm members 71' located on both sides of the bearing 8' is formed on the other end. An axis X of the output shaft 2' is approximately perpendicular to the axis Y of the main shaft 4', and an outer surface 81' of the bearing 8' is in tight contact with the inner surfaces of the arm members 71' of the shifting fork 7'. When the main shaft 4' rotates around the axis Y, by the cooperation of the bearing 8' and the shifting fork 7', the output shaft 2' is driven to perform oscillating motion around the axis X within a certain oscillating angle, and further, a tool head 6' mounted on the output shaft 2' is driven for reciprocating oscillation.

SUMMARY

The present invention is to provide an improved oscillating power tool, and such oscillating power tool can work under at least two different oscillating angles, and is relatively stable in structure and not prone to fail in working.

In an embodiment, a technical solution adopted by the present invention is an oscillating power tool, comprising a housing; a motor accommodated in the housing; a drive shaft driven by the motor to perform rotary motion; an output shaft driven by the drive shaft to oscillate around an axis per se; a transmission mechanism for converting rotary motion of the drive shaft into oscillation of the output shaft, wherein the transmission mechanism comprises an eccentric device mounted on the drive shaft and a shifting fork assembly connecting the eccentric device with the output shaft; the eccentric device comprises at least two drive members, the shifting fork assembly comprises a shifting fork member connected to the output shaft and a supporting member movably connected to the shifting fork member, the supporting member comprises a matching portion, the oscillating power tool further comprises an adjusting mechanism disposed in the housing, and the adjusting mechanism operably adjusts the supporting member to move, such that the matching portion is selectively abutted against one of the at least two drive members, thereby adjusting the output shaft to perform in different oscillating angles.

Preferably, the at least two drive members comprise a first drive member and a second drive member, in a first position, the matching portion is abutted against the first drive member, the output shaft performs in a first oscillating angle, and in a second position, the matching portion is abutted against the second drive member, and the output shaft performs in a second oscillating angle.

Preferably, an eccentric distance from the first drive member to the drive shaft equals to that from the second drive member to the drive shaft.

Preferably, the supporting member is rotatably connected to the shifting fork member around a pivot axis.

Preferably, the shifting fork member comprises a first end connected to the output shaft and a second end disposed opposite to the first end, wherein the supporting member is connected to the second end.

Preferably, the matching portion comprises a matching surface configured to be selectively matched with the first drive member and the second drive member.

Preferably, the matching surface is parallel to an axis of the drive shaft, and in the first position, the matching surface is abutted against the first drive member; and in the second position, the matching surface is abutted against the second drive member.

Preferably, a plane passing through the pivot axis and parallel to the axis of the output shaft is defined as a reference plane; and the matching surface penetrates through the reference plane when it rotates between the first position and the second position.

Preferably, the shifting fork member comprises two forklike arms being symmetrically disposed, and two matching portions being rotatably disposed on the two forklike arms around the pivot axis.

Preferably, the supporting member further comprises a connecting portion connecting the two matching portions, and an anti-rotation mechanism is disposed between the connecting portions and the matching portions.

Preferably, the matching portion is provided with a pivot shaft, and the supporting member is rotatably connected to the shifting fork member by the pivot shaft.

Preferably, the forklike arms are disposed between the matching portions and the connecting portions.

Preferably, a snap spring is connected to the pivot shaft, and an elastic member is disposed between the snap spring and the connecting portion.

Preferably, the anti-rotation mechanism comprises a first adapting member disposed on the pivot shaft and a second adapting member disposed on the connecting portion.

Preferably, a retaining mechanism is disposed between the supporting member and the shifting fork member, and the retaining mechanism is configured to retain the supporting member in the first position or the second position relative to the shifting fork member.

Preferably, the adjusting mechanism comprises an operating unit movably connected to the housing and a transmitting unit connected to the operating unit, wherein the transmitting unit is selectively engaged with the supporting member to convert motion of the operating unit into rotation of the supporting member between the first position and the second position.

Preferably, the operating unit comprises an operating member movably connected to the housing.

Preferably, the transmitting unit comprises a transmitting member connected to the operating member and a rotary assembly connected to the transmitting member, wherein the rotary assembly is rotatably connected to the housing around a rotary axis.

Preferably, the rotary assembly comprises a rotary shaft connected to the transmitting member, a connecting rod connected to the rotary shaft and a clamping rod disposed at an angle with respect to the connecting rod, the clamping rod is selectively matched with the supporting member.

Preferably, the transmitting member comprises a transmitting portion connected to the operating member and a waist-shaped hole matched with the rotary shaft.

Preferably, the supporting member is provided with a clamping portion matched with the clamping rod.

Preferably, the clamping portion comprises a U-shaped opening.

Preferably, the oscillating power tool further comprises a blocking member movably disposed relative to the housing and a stopping member disposed on the rotary assembly, the stopping member comprises a limiting portion and a coupling portion; when the blocking member is abutted against the limiting portion, the adjusting mechanism is stopped from driving the supporting member to move, so that the oscillating power tool is shiftable between a working state and a nonworking state; and when the blocking member is slidably matched with the coupling portion, the adjusting mechanism is permitted to drive the supporting member to move, so that the oscillating power tool is in the nonworking state.

Preferably, the stopping member is disposed on the rotary shaft.

Compared with the prior art, the present invention has the beneficial effects that by the adjusting mechanism, the supporting member disposed between the shifting fork member and the drive member is operably moved to different positions, such that the matching portion of the supporting member is engaged with different drive members, thereby causing the output shaft to output different oscillating angles to meet the working requirements of different occasions. Besides, the structure is stable relatively, and the working is not prone to fail.

BRIEF DESCRIPTION OF THE DRAWINGS

The above objectives, technical solutions and beneficial effects of the present invention can be clearly obtained by the following detailed description on specific embodiments capable of implementing the present invention in combination with the accompanying drawings.

The same numbers and signs in the accompanying drawings and the description are used for representing the same or equivalent elements.

DETAILED DESCRIPTION

The preferred embodiments of the present invention are elaborated in detail in combination with the accompanying drawings, such that the advantages and features of the present invention are more easily understood by those skilled in the art, thereby more clearly and explicitly defining a protective scope of the present invention.

Figure 1:
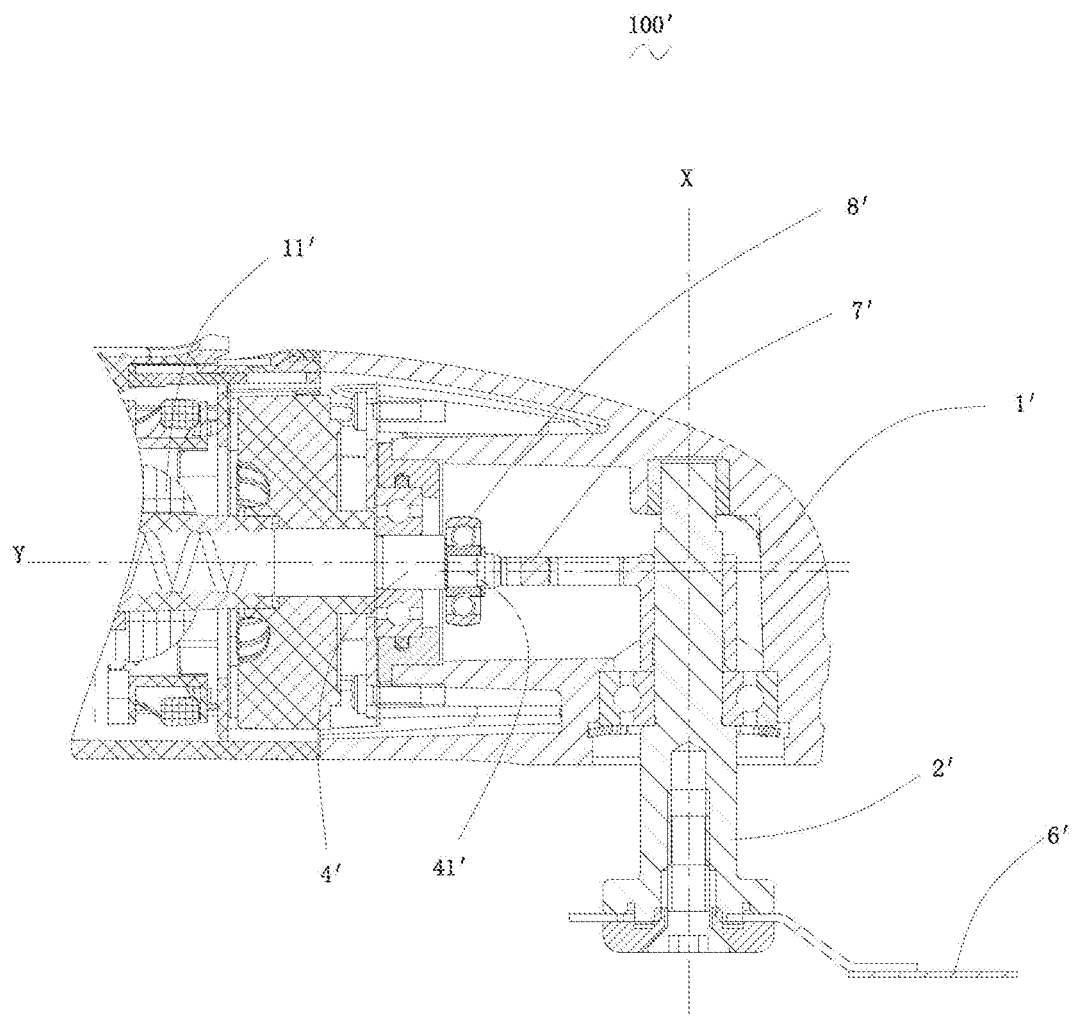
FIG. 1 is a sectional schematic view of an existing oscillating power tool.
Figure 2:
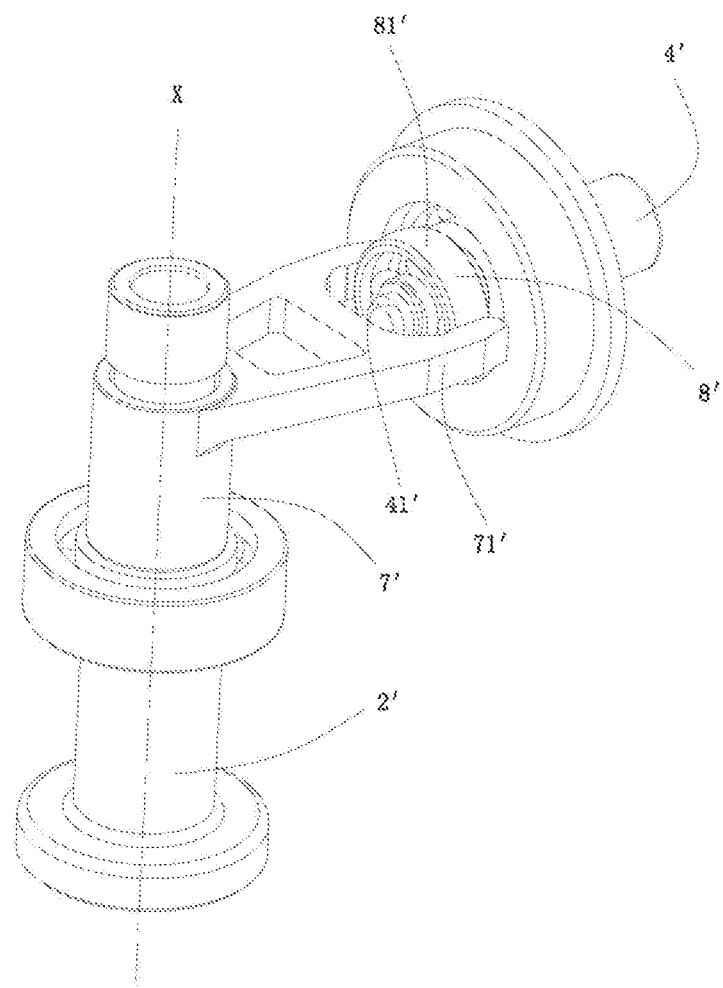
FIG. 2 is a stereoscopic schematic view of a partial structure of the oscillating power tool as shown in FIG. 1.
Figure 3:
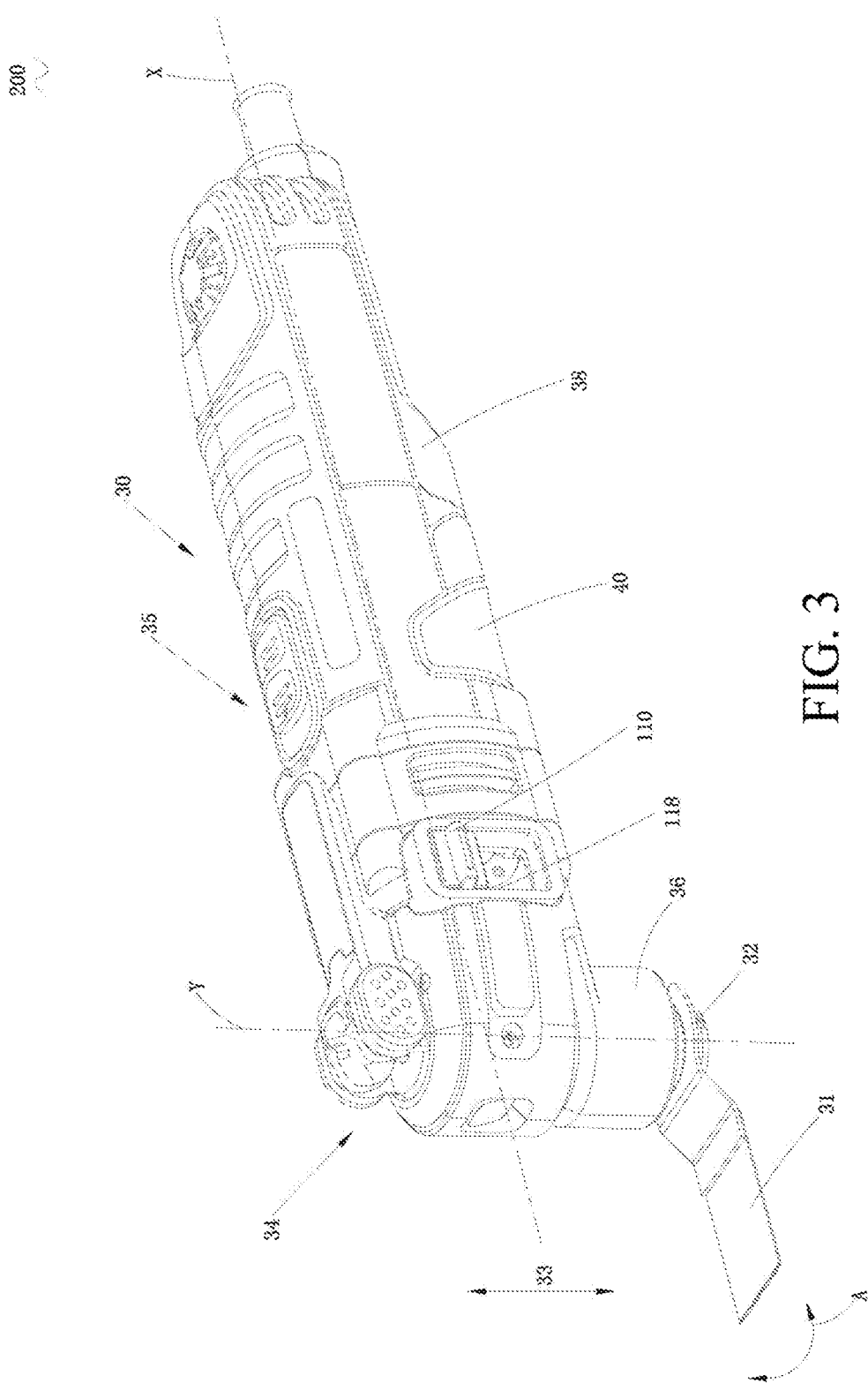
FIG. 3 is an integral schematic view of an oscillating power tool according to an example embodiment.

Referring to FIG. 3, the oscillating power tool 200 comprises a housing 30, an output shaft 32 extending out from the interior of the housing 30, a working head 31 mounted on the tail end of the output shaft 32 and a clamping assembly 34 for clamping the working head 31 in an axial direction of the output shaft. In the present embodiment, the working head is a straight saw blade. Of course, the working head may also be a circular saw blade, a triangular sanding disc, a scraper, etc. The axial direction 33 approximately extends in parallel with an axis Y of the output shaft.

The housing 30 comprises a head housing 36 and an enclosure 38 connected to each other. The enclosure 38 approximately extends straightly, and its longitudinal extending axis is X1. In the present embodiment, the longitudinal extending axis X1 of the enclosure 38 is approximately perpendicular to the axis Y of the output shaft. Member of the head housing 36 is bent and extends relative to the enclosure 38 from one end of the enclosure 38, and at least partially contains the output shaft 32. The enclosure 38 has a holding region 40, and a user holds the holding area 40 in the process of tool guiding. In addition, the housing 30 is provided with a switch assembly 35 for controlling the oscillating power tool 200 to work or stop working.

Figure 4:
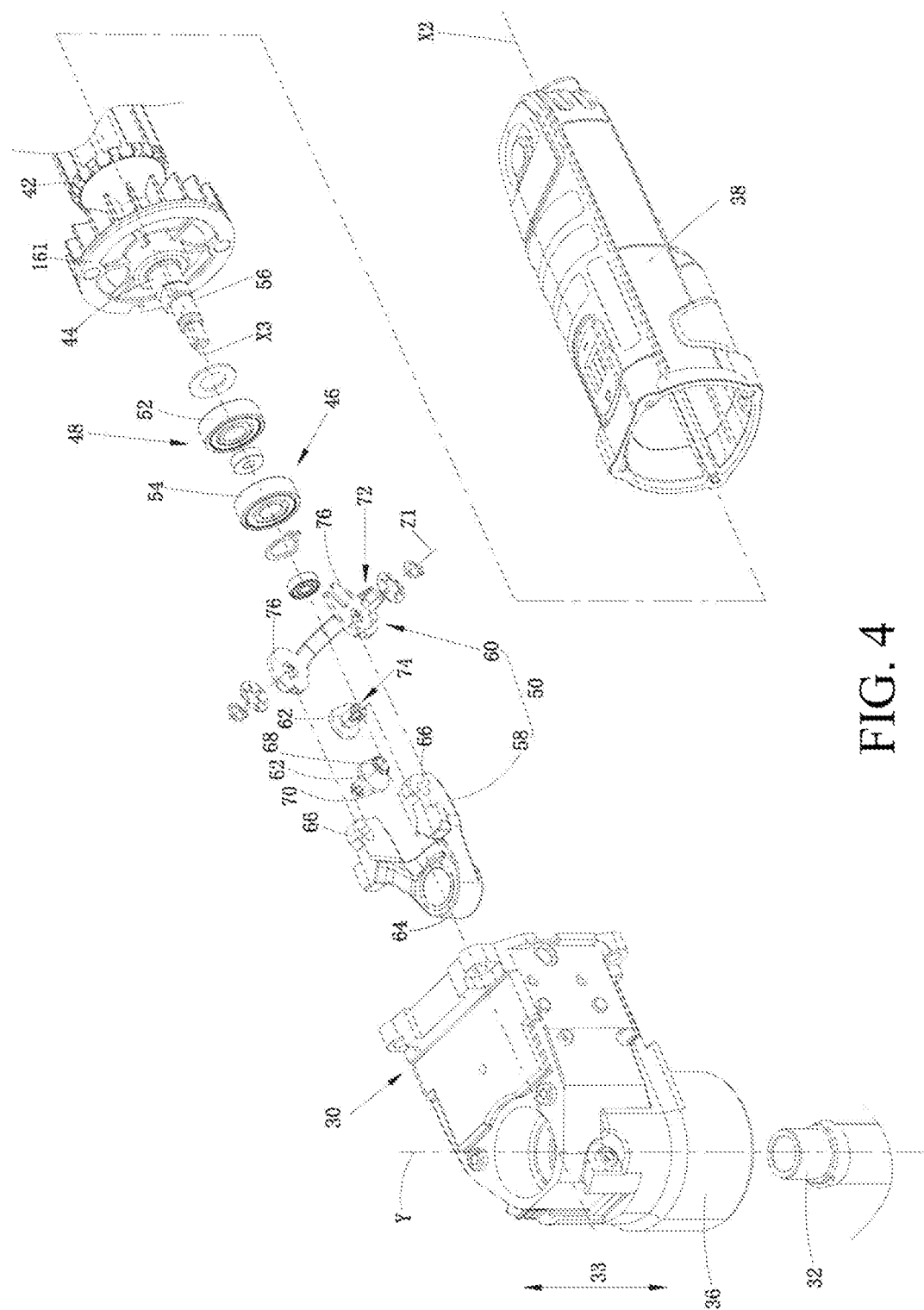
FIG. 4 is a partial stereoscopic exploded view of the oscillating power tool as shown in FIG. 3.

Referring to FIG. 4, the enclosure 38 contains a motor 42 (only member thereof is shown), and a drive shaft 44 is mounted to the motor 42, and is driven by the motor 42 to perform rotary motion around the axis X2 of the drive shaft. The plane penetrating through the axis X2 of the drive shaft and the axis Y of the output shaft is defined as a middle plane.

In the present embodiment, the axis X2 of the drive shaft and the longitudinal extending axis X1 of the enclosure 38 are coincided. That is, the axis X2 of the drive shaft is also approximately perpendicular to the axis Y of the output shaft. Of course, the axis X2 of the drive shaft and the longitudinal extending axis X1 of the enclosure 38 are disposed in parallel or at an angle.

Continuing to refer to FIG. 4, a transmission mechanism 46 is disposed between the drive shaft 44 and the output shaft 32, by the transmission mechanism 46, the rotary motion of the motor 42 around the axis X2 of the drive shaft is converted into the oscillating motion of the output shaft 32 around the axis Y, and a oscillating direction is as shown by an arrow A in FIG. 3. When the tail end of the output shaft 32 is connected to different working heads, such as the straight saw blade, the circular saw blade, the triangular sanding disc, etc., the operations such as cutting or grinding can be realized.

The transmission mechanism 46 is disposed in the head housing 36, and comprises an eccentric device 48 and a shifting fork assembly 50. The eccentric device 48 is mounted on the drive shaft 44 and the shifting fork assembly 50 is mounted on the output shaft 32.

Specifically, the eccentric device 48 comprises at least two drive members. The plurality of drive shafts have multiple specific forms. In the present embodiment, the plurality of drive members are common ball bearings in the industry. The ball bearings have a radius of certain size. The multiple drive members may have the same radius and may also have different radii. In addition, the drive members according to the present embodiments may freely selectively have certain eccentric distance relative to the drive shaft 44. In the embodiments with the certain eccentric distance, the drive members may have the eccentric distance of the same size and may also have the eccentric distance of different sizes.

In the present embodiment, the eccentric device 48 comprises two drive members which are a first drive member 52 and a second drive member 54 respectively. Wherein the first drive member 52 is close to the motor 42 or in other words away from the output shaft 32, while the second drive member 54 is away from the motor 42 or in other words close to the output shaft 32.

The first drive member 52 and the second drive member 54 have the same radius and are arranged along the axial direction of the drive shaft 44 in sequence, and are disposed by separating from each other by a certain gap in preferred embodiments.

The eccentric device 48 further comprises an eccentric shaft 56 fixedly connected to the drive shaft 44. Specifically, the eccentric shaft 56 is eccentrically connected to the drive shaft 44. That is, an axis X3 of the eccentric shaft 56 and the axis X2 of the drive shaft 44 are not coincided and are radially deviated by certain interval. The first drive member 52 and the second drive member 54 are mounted on the eccentric shaft 56 in sequence. The first drive member 52 and the second drive member 54 are mounted on the eccentric shaft 56 without relative rotation, thereby being driven by the drive shaft 44 to perform rotary motion. While in the present embodiment, the first drive member 52 and the second drive member 54 have the same radius and are mounted on the sane eccentric shaft 56. Therefore, the first drive member 52 and the second drive member 54 have the same eccentric distance relative to the drive shaft 44.

Of course, the multiple drive members may also have the eccentric distances of different sizes relative to the drive shaft. Specifically, if the plurality of drive members have the same radius, then the eccentric shafts having different eccentric distances may be disposed, and respective eccentric shafts have different offsets relative to the axis X2 of the drive shaft. Or the same one eccentric shaft is disposed, and the multiple drive members have different radii.

Besides, the multiple drive members may also be disposed eccentrically per se and are sequentially mounted on a mounting shaft not deviated relative to the drive shaft. At this point, if having the same radius, then the multiple drive members have the same eccentric distance. If having different radii, the multiple drive members have the eccentric distances of different sizes.

The shifting fork assembly 50 comprises a shifting fork member 58 and a supporting member 60 movably connected to the shifting fork member 58. The supporting member 60 connects the eccentric device 48 with the shifting fork member 58. The supporting member 60 comprises a matching portion 62, and can be operably moved to cause the matching portion 62 to be abutted against different drive members (the first and second drive members 52 and 54), such that the shifting fork member 58 is driven to oscillating with different amplitudes, and therefore, the output shaft performs in different oscillating angles.

The shifting fork member 58 comprises a first end connected to the top of the output shaft 32 and an opposite second end. Specifically, the first end of the shifting fork member 58 is a sleeve 64 sleeving the output shaft 32, and the second end of the shifting fork member 58 is two symmetric forklike arms 66 perpendicular to the sleeve 64 and horizontally extending to the drive shaft 44. The forklike arms 66 of the shifting fork member 58 are disposed on both sides of the first and second drive members 52 and 54. In the present embodiments, the forklike arms 66 are not directly abutted against the first and second drive members 52 and 54 but are linked by the matching portion 62.

The supporting member 60 is rotatably connected to the second end of the shifting fork member 58 around a pivot axis Z1. The pivot axis Z1 is disposed by approximately extending along a direction perpendicular to the axis Y of the output shaft and the axis X2 of the drive shaft. The plane penetrating through the pivot axis Z1 and parallel with the axis Y of the output shaft is defined as a reference plane.

In the present embodiment, the supporting member 60 comprises two matching portions 62 which are respectively rotatably disposed on the two forklike arms 66 around the pivot axis Z1. The two matching portions 62 are abutted against the first drive member 52 or the second drive member 54 simultaneously, such that the output shaft performs in different oscillating angles. Of course, the different oscillating angles can also be realized if only one matching portion is disposed.

The two matching portions 62 are disposed symmetrically. One matching portion is taken as an example to describe its specific structure. The matching portion 62 comprises a matching surface 68, and the matching surface 68 is selectively abutted against the first drive member 52 or the second drive member 54. After the matching portion 62 is mounted on the forklike arms 66, in the rotation process of the matching portion 62 around the pivot axis Z1, the matching surface 68 penetrates through the reference plane. That is, when the matching surface 68 is abutted against different drive members, the position thereof is respectively located on both sides of the reference plane.

The matching portion 62 further comprises an abutting surface 70 abutted against the shifting fork member 58 and transmitting a force. The abutting surface 70 is disposed back to the matching surface 68. In general cases, an area of the abutting surface 70 is larger than that of the matching surface 68. In the rotation process of the matching portion 62 around the pivot axis Z1, the projection of the abutting surface 70 on a central plane is not changed, then the matching position of the matching portion 62 and the shifting fork member 58 is not changed either. However, it may also like the present embodiment, in the rotation process of the matching portion 62 around the pivot axis Z1, the projection of the abutting surface on the central plane is changed. Therefore, the matching portion 62 is abutted against different positions of the shifting fork member 58.

Further, the supporting member 60 further comprises a connecting portion 72 connected to the two matching portions 62, and an anti-rotation mechanism 74 is disposed between the connecting portion 72 and the matching portions 62.

The connecting portion 72 is approximately U-shaped and comprises mounting ends 76 located on two free ends and a connecting end 78 connected to the two mounting ends 76. The mounting ends 76 are approximately circular, and one of the mounting ends 76 is provided with a clamping portion 80. The clamping portion 80 comprises an approximately U-shaped opening 81, and its function will be described in detail hereinafter.

Figure 5:
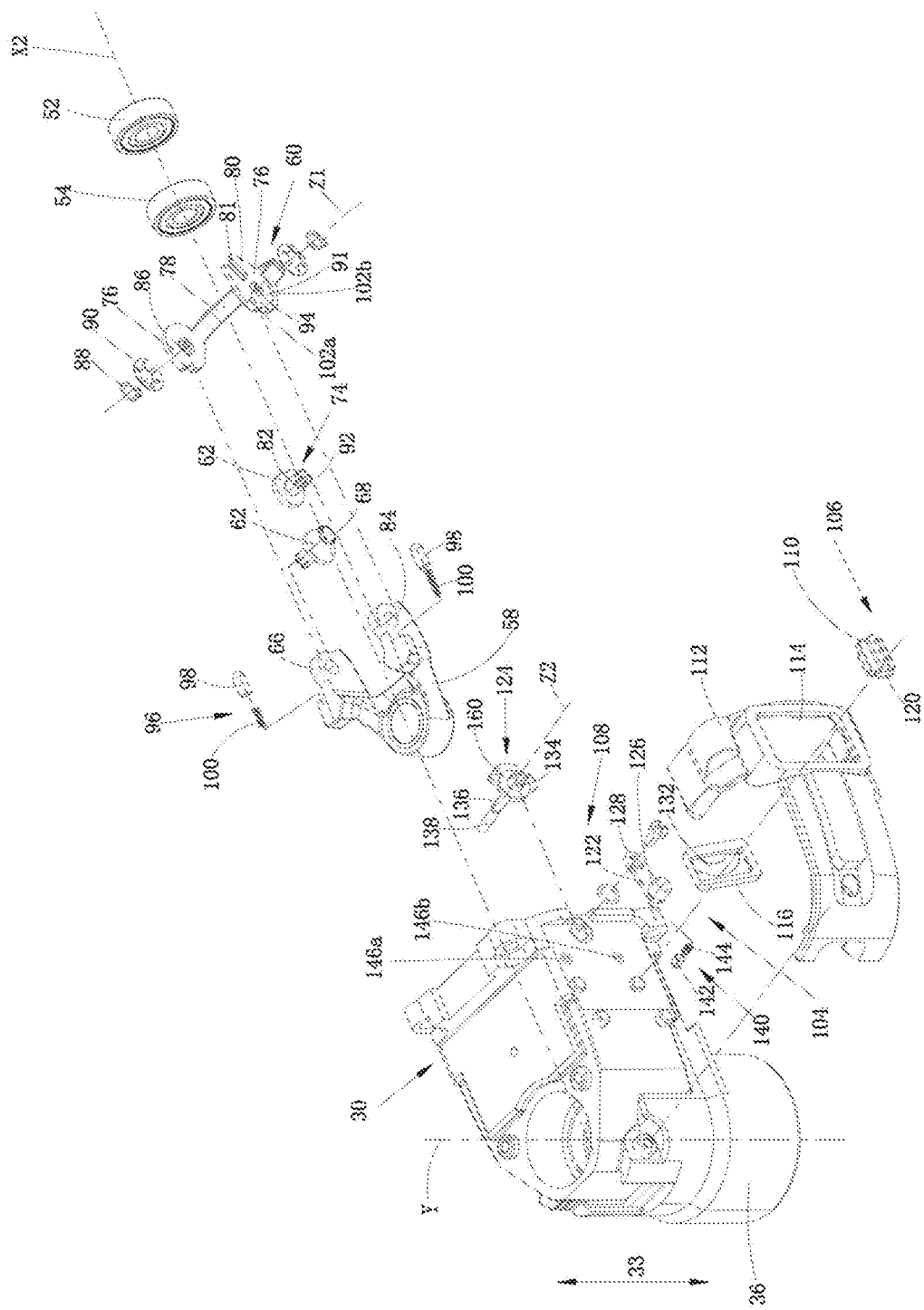
FIG. 5 is a partial stereoscopic exploded view of the oscillating power tool as shown in FIG. 3.

Further referring to FIG. 5, the matching portions 62 are provided with pivot shafts 82, and the forklike arms 66 are provided with first through holes 84 to be penetrated by the pivot shafts 82. The mounting ends 76 are provided with second through holes 86 to be penetrated by the pivot shafts 82. During mounting, the pivot shafts 82 penetrate through the first through holes 84 in the forklike arms 66 and the second through holes 86 in the mounting ends 76 in sequence. Therefore, the supporting member 60 can be in pivoting connection relative to the shifting fork member 85 around the pivot axis Z1. When the supporting member 60 moves, the matching surface 68 is selectively abutted against the first drive member 52 or the second drive member 54 (referring to FIG. 6, the matching surface 68 is abutted against the first drive member 52), such that the output shaft 32 performs in different oscillating angles.

In the present embodiment, the forklike arms 66 are disposed between the matching portions 62 and the mounting ends 76 of the connecting portion 72. Of course, the matching portions 62 and the mounting ends 76 may also be disposed on one side of the forklike arms 66.

In the present embodiment, the free ends of the pivot shafts 82 are connected to snap springs 88. The matching portions 62, the connecting portion 72 and the forklike arms 66 are relatively fixed by the snap springs. In order to eliminate an axial gap, spring members 90 are further disposed between the snap springs and the connecting portion 72. Here, the spring members 90 may be belleville springs.

Specifically, the mounting ends 76 of the connecting portion 72 are further provided with dents 91 for containing the spring members 90, thereby saving the whole size.

In order for the matching portions 62 and the connecting portion 72 to synchronously rotate around the pivot axis Z1, the anti-rotation mechanism 74 is disposed between the connecting portion 72 and the matching portions 62. In the present embodiment, the anti-rotation mechanism 74 comprises a first adapting member 92 disposed on the pivot shaft 82 and a second adapting member 92 disposed on the mounting end 76 of the connecting portion 72. Specifically, the first adapting member 92 is a boss with an I-shaped section. The second adapting member 94 is a groove disposed in the approximate position of the mounting end 76 and having an I-shaped section. During mounting, the I-shaped boss 92 of the matching portion 62 is inserted by aligning with the I-shaped groove. In this way, the two matching portions 62 and the connecting portion 72 can synchronously rotate around the pivot axis Z1.

Of course, as understood by those skilled in the art, the first adapting member 92 and the second adapting member 94 are not limited to the I shape, and may have many specific forms.

Figure 6:
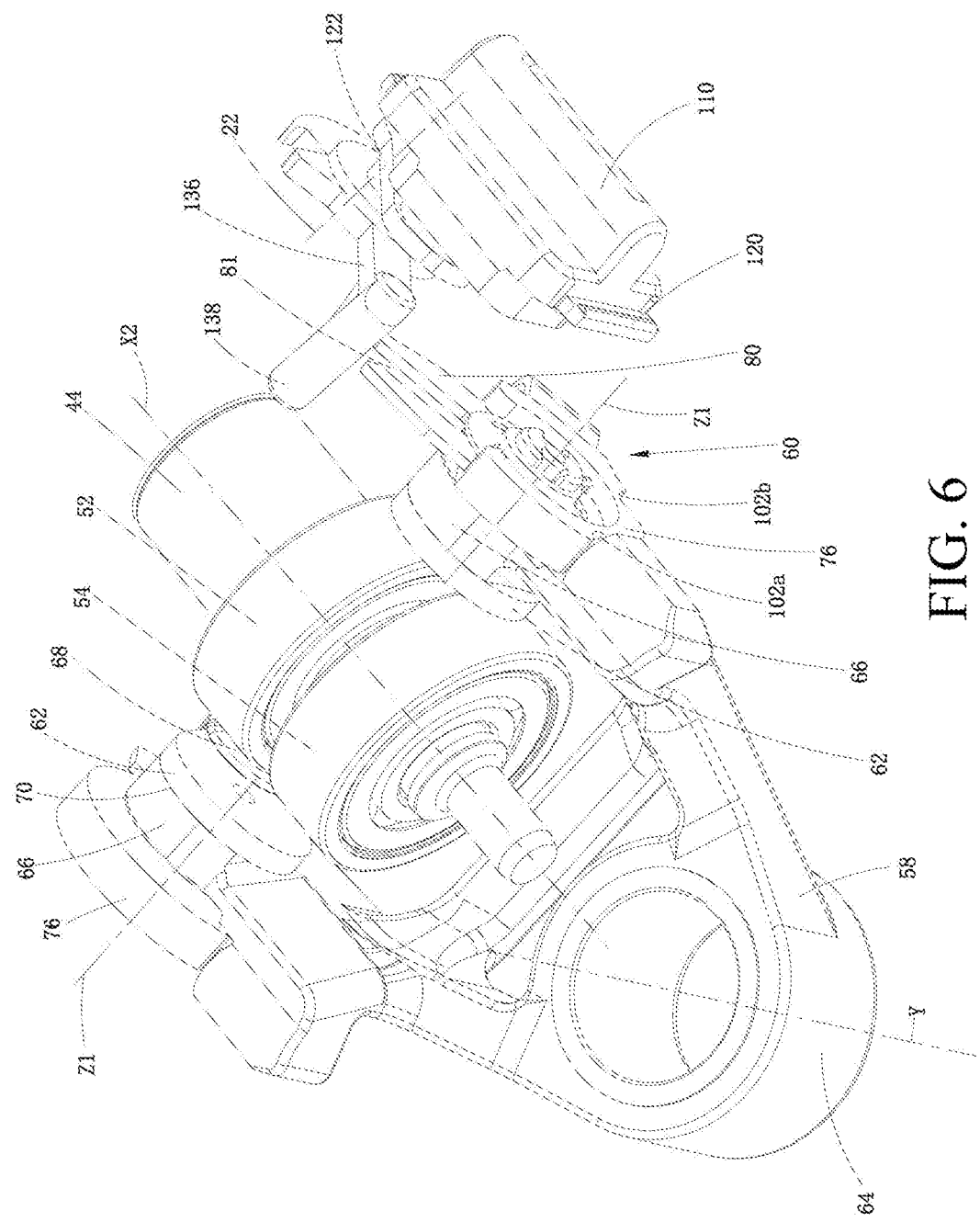
FIG. 6 is a partial stereoscopic schematic view of the oscillating power tool as shown in FIG. 3, and at this point, a matching portion is in a first position.
Figure 7:
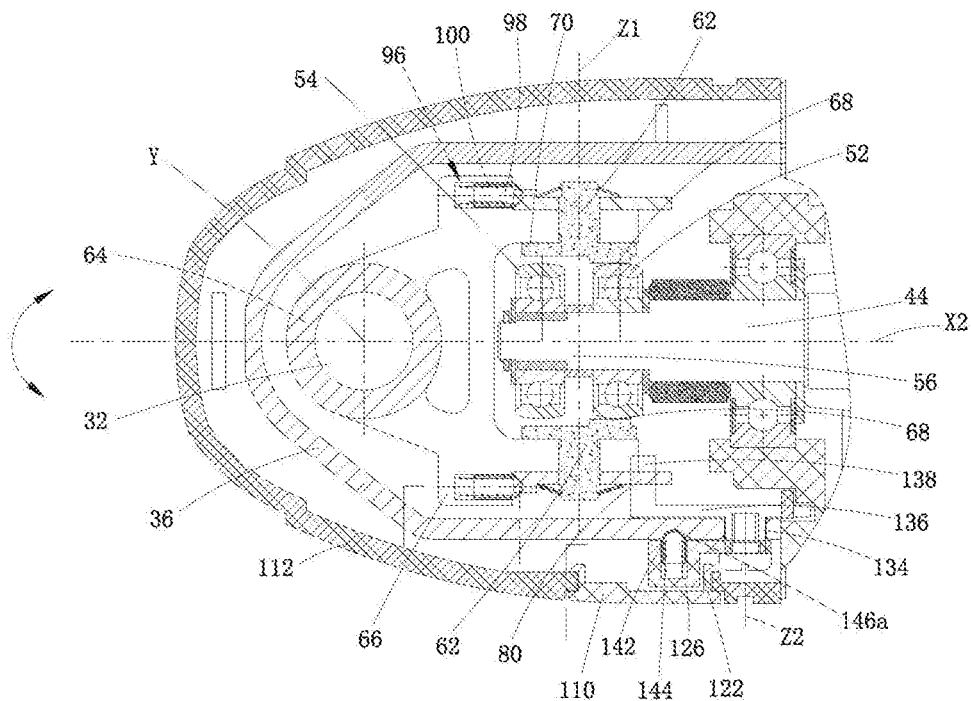
FIG. 7 is a sectional view of a head housing member of the oscillating power tool as shown in FIG. 3.

Referring to FIGS. 6 and 7, the supporting member 60 may rotate around the pivot axis Z1, such that the matching portion 62 moves between a first position abutted against the first drive member 52 and a second position abutted against the second drive member 54. The matching surface 68 is parallel with the axis X2 of the drive shaft, and when the matching portion 62 is in the first position, the matching surface 68 is in slide contact with the outer surface of the first drive member 52. When the motor 42 drives the drive shaft 44 to rotate, the eccentric shaft 56 is driven by the drive shaft 44 to eccentrically rotate relative to the axis X2 of the drive shaft, and further the first drive member 52 is driven to eccentrically rotate relative to the axis X2 of the motor. The matching surface 68 is in slide contact with the outer surface of the first drive member 52, under the driving of the matching portions 62, the shifting fork member 58 oscillates relative to the axis Y of the output shaft, and further the output shaft 32 is driven to oscillate at a first oscillating angle around its axis Y.

When the matching portion 62 is in the second position, the matching surface 68 is in slide contact with the outer surface of the second drive member 54, and under driving of the matching portion 62, the shifting fork member 58 oscillates relative to the axis Y of the output shaft, and further the output shaft 32 is driven to oscillate at a second oscillating angle around its axis Y.

The first oscillating angle is smaller than the second oscillating angle, and the user may select a proper oscillating angle according to actual working conditions.

In order to prevent the supporting member 60 from being departured from the first position or the second position caused by vibration in working, a retaining mechanism 96 is disposed between the supporting member 60 and the shifting fork member 58, and the retaining mechanism 96 is configured to retain the supporting member 60 in a plurality of positions relative to the shifting fork member 58.

In the present embodiment, when the supporting member 60 moves to the first or second position, the retaining mechanism 96 can stably retain the supporting member 60 in the first or second position.

Referring to FIGS. 5 and 6, the retaining mechanism 96 comprises a retaining member 98 and an elastic element 100 for providing a bias pressure of the retaining member. The retaining member 98 is disposed on the shifting fork member 58 and leans against the supporting member 60 under the bias pressure of the elastic element 100, so as to play a role of locating and retaining the supporting member 60. While when the locating action is required to be removed to move the supporting member 60, the user only needs to overcome the bias pressure of the elastic element 100.

Correspondingly, the supporting member 60 is retained in the first position or the second position. The supporting member 60 is further provided with two retaining grooves 102a and 102b. When the supporting member 60 moves, the retaining member 98 is matched with the retaining groove 102a under the bias pressure of the elastic element 100, and then the supporting member 60 can be stably retained in the first position. When the supporting member 60 moves to the second position, the retaining member 98 is matched with the retaining groove 102b under the bias pressure of the elastic element 100.

The oscillating power tool 200 also has an adjusting mechanism 104 for adjusting the supporting member 60 to move. Such adjusting mechanism 104 adjusts the supporting member 60 to rotate around the pivot axis Z1, such that the matching portion 62 moves between the first position abutted against the first drive member 52 and the second position abutted against the second drive member 54. Therefore, the output shaft 32 is adjusted to have different oscillating angles, that is, is switched between the first oscillating angle and the second oscillating angle. Referring to FIG. 5 again, the adjusting mechanism 104 is disposed on the housing 30 and is convenient for the operation and adjustment by the user. Preferably, the adjusting mechanism 104 is disposed on the head housing 36, and in this way, the supporting member 60 is convenient to operate.

The adjusting mechanism 104 comprises an operation unit 106 movably connected to the housing 30 and a transmitting unit 108 connected to the operation unit 106, wherein the transmitting unit 108 is selectively matched with the supporting member 60, for converting motion of the operating unit 106 into rotation of the supporting member 60 between the first position and the second position.

The operating unit 106 comprises an operating member 110 for user operation. In the present embodiment, the operating member 110 is movably connected on the head housing 36. Preferably, the operating member 110 linearly moves, such that the transmitting unit 108 converts the linear motion of the operating unit 106 into the rotation of the supporting member 60 between the first position and the second position. Preferably, the linear motion of the operating member 110 is straight line motion along an axial direction 33 of the output shaft. Of course, a moving direction of the operating member 110 and the axial direction 33 of the output shaft may also intersect or the operating member 110 is rotatably disposed on the head housing 36. Of course, the operating member 110 may also be pivotally disposed on the housing 30.

Specifically, a cover body 112 is fixedly connected on the head housing 36, and the cover body 112 is provided with an operating groove 114 for the operating member 110 to penetrate outwards from the interior of the head housing 36. The cover body 112 is further fixedly provided with a mounting member 116, and a containing groove 118 (referring to FIG. 3) is disposed between the mounting member 116 and the cover body 112. The operating member 110 is provided with a mounting portion 120, and the mounting portion 120 can move in the containing groove 118 along the axial direction 33 of the output shaft.

The transmitting unit 108 comprises a transmitting member 122 connected to the operating member 110 and a rotary assembly 124 connected to the transmitting member 122, wherein the rotary assembly 124 is rotatably connected on the housing 30 around a rotary axis Z2. Wherein the rotary assembly 124 is selectively matched with the supporting member 60, and configured to operate the supporting member 60 to rotate between the first position and the second position.

In the present embodiment, the transmitting member 122 is approximately rodlike, is provided with a transmitting portion 126 connected to the operating member 110 and is provided with a waist-shaped hole connected to the rotary assembly 124 in the other end. The operating member 110 is provided with a containing cavity (not shown) for containing the transmitting portion 126. The mounting member 116 is provided with an arc-shaped groove 132 to be penetrated by the transmitting portion 126, and a circle center of the arc-shaped groove 132 is located on the rotary axis Z2. The transmitting portion 126 penetrates through the arc-shaped groove 132 to be matched with the containing cavity of the operating member 110.

The transmitting portion 126 is approximately cylindrical, the shape of the containing cavity is rectangular, and a diameter of the transmitting portion 126 is equal to a width of the containing cavity. Therefore, after the transmitting portion 126 is contained to the containing cavity, along the axial direction 33 of the output shaft, the transmitting portion 126 has no or smaller relative motion relative to the containing cavity, but can freely move in a direction perpendicular to the axial direction 33 of the output shaft. Therefore, when moving along the axial direction 33 of the output shaft, the operating member 110 can drive the transmitting portion 126 to rotate around the rotary axis Z2.

The rotary assembly 124 comprises a rotary shaft 134 connected to the transmitting portion 126, a connecting rod 136 connected to the rotary shaft 134 and a clamping rod 138 disposed at an angle relative to the connecting rod 136. The clamping rod 138 is selectively matched with the clamping portion 80 of the supporting member 60.

The rotary shaft 134 is rotatably connected on the head housing 36 around the rotary axis Z2. One end of the rotary shaft 134 is connected to the waist-shaped hole 128. Therefore, the operating member 110 drives the transmitting portion 126 to rotate around the rotary axis Z2, and can also drive the rotary shaft 134 and the connecting rod 136 and the clamping rod 138 connected to the rotary shaft 134 to rotate around the rotary axis Z2.

Figure 8:
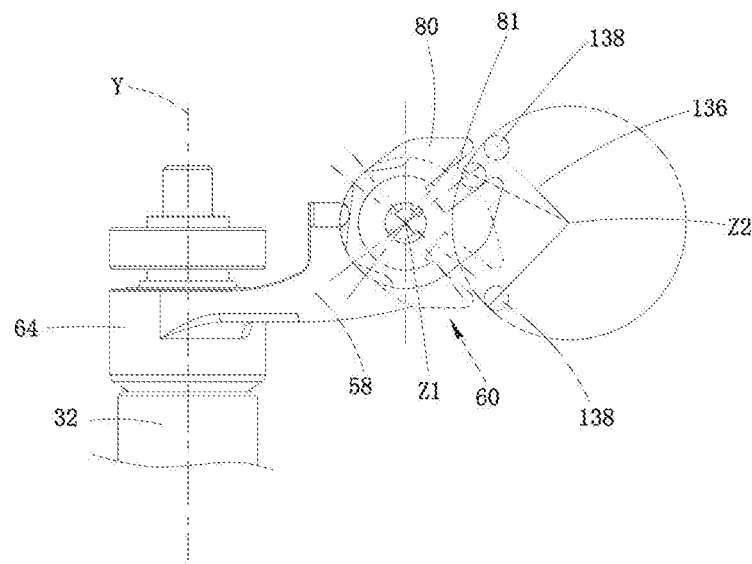
FIG. 8 is a matching schematic view of a clamping rod and a clamping portion of the oscillating power tool as shown in FIG. 3.

The clamping rod 138 is disposed at an angle relative to the connecting rod 136. Preferably, the clamping rod 138 and the connecting rod 136 are disposed at an angle of 90 degrees. Referring to FIG. 8, the clamping rod 138 is not matched with the clamping portion 80 when the supporting member 60 is in the first position and the second position. Only when the oscillating angle is required to be switched, that is, when the operating member 110 moves along the axial direction 33 of the output shaft, the clamping rod 138 will be rotatably clamped in the U-shaped opening 81 in the process of driving the clamping rod 138 to rotate around the rotary axis Z2, thereby driving the supporting member 60 to rotate around the pivot axis Z1. In this way, when the oscillating angle has been determined as the first oscillating angle or the second oscillating angle, the adjusting mechanism 104 is disengaged from the supporting member 60, such that the adjusting mechanism 104 is not affected while the supporting member 60 and the shifting fork 58 oscillate, and the operating member 110 is prevented from being driven to oscillate synchronously.

The switching process of the oscillating angle is introduced in detail in the following. It is assumed that initial position of the oscillating power tool 200 is as shown in FIGS. 6 and 7. At this point, the matching surface 68 of the support 60 is abutted against the first drive member 52. After the oscillating power tool 200 is started to work, and when the motor 42 drives the drive shaft 44 to rotate, the eccentric shaft 56 is driven by the drive shaft 44 to eccentrically rotate relative to the axis X2 of the drive shaft, and further, the first drive member 52 is driven to eccentrically rotate relative to the axis X2 of the motor. The matching surface 68 is in slide contact with the outer surface of the first drive member 52, and under the driving of the matching portion 62, the shifting fork member 58 oscillates relative to the axis Y of the output shaft, and further the output shaft 32 is driven to oscillate at the first oscillating angle around the axis Y per se.

While when the user needs to output a larger oscillating angle according to actual working conditions, the user operates the adjusting mechanism 104 and downward shifts the operating member 110, so as to drive the rotary assembly 124 to rotate around the rotary axis Z2. In this way, the clamping rod 138 rotates around the rotary axis Z2. Referring to FIG. 8, the clamping rod 138 rotates counterclockwise, and in the rotary process, the clamping rod 138 is clamped in the U-shaped opening 81, so as to drive the supporting member 60 to rotate around the pivot axis Z1. Therefore, the abutting between the matching surface 68 and the first drive member 52 is converted into the abutting between the matching surface 68 and the second drive member 54. In this way, after the oscillating power tool 200 is started to work, the output shaft 32 correspondingly outputs a larger oscillating angle for oscillating motion. If the user needs a small oscillating angle, only the adjusting mechanism 104 is required to be operated in the opposite direction to return the supporting member 60 back to the initial position. In this way, the oscillating angle of the oscillating power tool 200 can be adjusted.

It is known from the above description that by the adjusting mechanism, the supporting member located between the shifting fork and the drive member is operably moved to different positions, such that the matching surface is matched with different drive members, and the output shaft outputs different oscillating angles to meet the working requirements of different working occasions. The structure is relatively stable, and the working is not easily failed. But the present embodiments is not limited thereto, and can also be realized in a manner that the matching portion is provided with two matching surfaces which are respectively matched with the first drive member and the second drive member.

In order to limit a moving range of the operating member 110 and the sufficient switching of the oscillating angle, a locating mechanism 140 is disposed between the housing 30 and the adjusting mechanism 104. Referring to FIGS. 5 and 7 again, in the present embodiment, the locating mechanism 140 comprises a locating member 142 and a spring 144 providing a bias pressure of the locating member 142. The locating member 142 is disposed on the transmitting portion 126, and leans against the head housing 36 under the bias pressure of the spring 144, so as to play a role of locating the operating member 110. While when the locating action is required to be removed to move the operating member 110, the user only needs to overcome the bias pressure of the spring 144.

Switching is correspondingly performed between the two oscillating angles. The head housing 36 is further provided with two locating grooves 146a and 146b. When the operating member 110 moves to drive the transmitting portion 126 to rotate, the locating member 142 is matched with the locating groove 146a under the bias pressure of the spring 144, and then the switching to the first position can be determined. When the operating member 110 moves to drive the transmitting portion 126 to move to the second position, the locating member 142 is matched with the locating groove 146b under the bias pressure of the spring 144 (not shown), and then an operator can know the switching to the second position.

In order for clear explanation, the position of the housing 30 corresponding to the operating member 110 may also be provided with an indication structure, which is convenient for the user to know a working mode of the current oscillating power tool 200. The indication structure may be an arrow, an illustrative introduction, etc.

In order for safety, when the oscillating power tool 200 works, the adjusting mechanism 104 is not allowed to perform the switching of the oscillating angle. Similarly, when the adjusting mechanism 104 performs the switching of the oscillating angle, the oscillating power tool 200 is not allowed to be started for working. Therefore, the oscillating power tool 200 further comprises a blocking mechanism movably disposed relative to the housing 30. The blocking mechanism has two positions. When the switch assembly 35 starts the motor 42, the blocking mechanism is in the first position, the adjusting mechanism 104 is stopped from driving the supporting member 60 to move, and the switching of the oscillating angle is avoided. At this point, the oscillating power tool 200 can be switched between a working state and a nonworking state. When the adjusting mechanism 104 drives the supporting member 60 to move to perform the switching of the oscillating angle, the blocking mechanism is in the second position to stop the switch assembly 35 from starting the motor 42. The oscillating power tool 200 is in the nonworking state.

Figure 9:
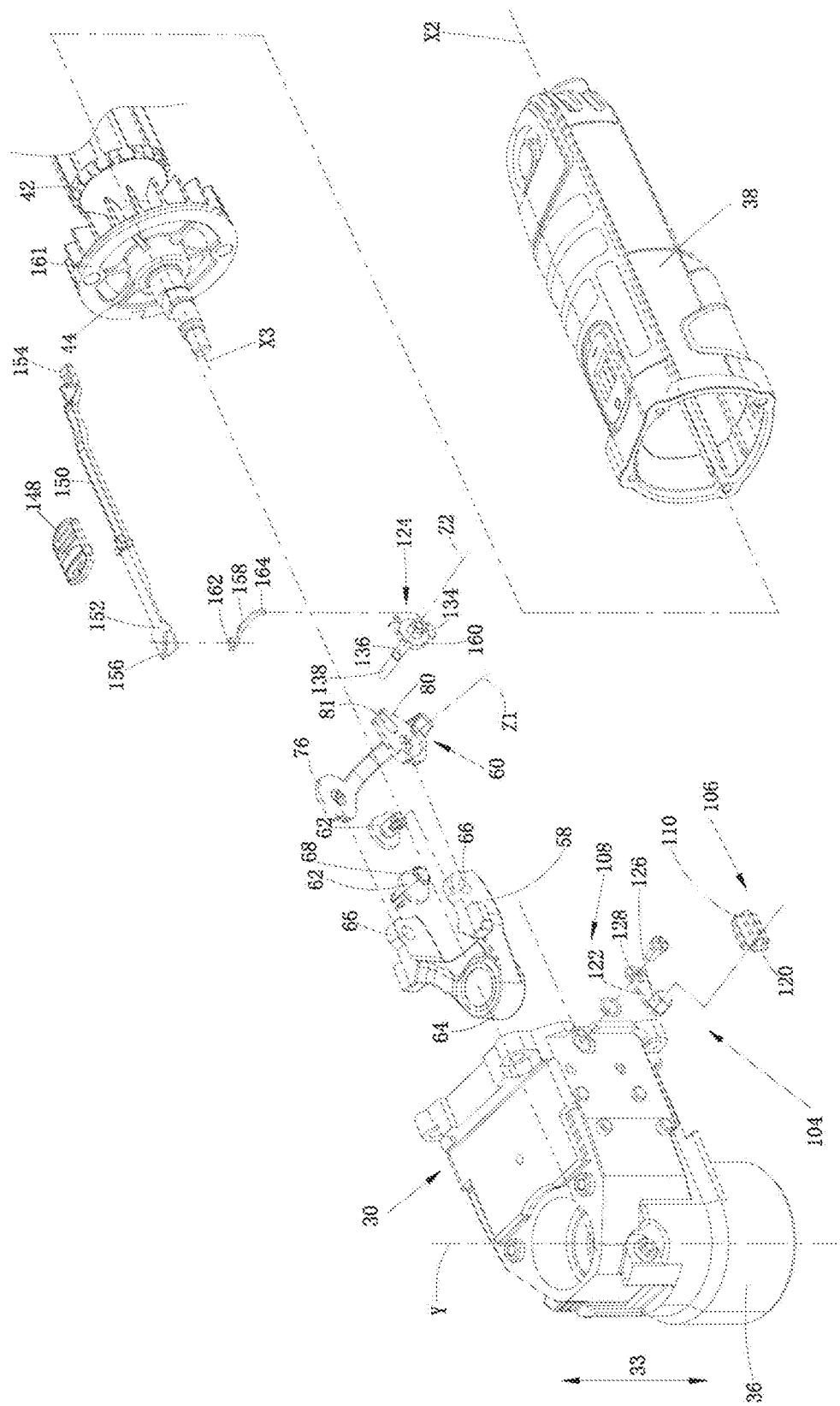
FIG. 9 is a partial stereoscopic exploded view of the oscillating power tool as shown in FIG. 3.

Then referring to FIG. 9, the switch assembly 35 comprises a switch knob 148 and a triggering member 150 fixedly connected to the switch knob 148. A switch (not shown) is electrically connected on the motor 42, and configured to start the motor operation or close the motor operation. The switch knob 148 is movably disposed on the housing 30, and configured to drive the triggering member 150 to trigger the switch to be ON or OFF, such that the oscillating power tool 200 is correspondingly switched between the working state and the nonworking state. The triggering member 150 has a starting position for starting the motor 42 and a closing position of closing the motor 42.

The triggering member 150 has a first contact portion 152 and a second contact portion 154. Wherein the second contact portion 154 is configured to be connected with or disconnected from the switch. Generally, by causing the triggering member 150 to slide to a direction close to the working head (not shown), the second contact portion 154 triggers the switch, the triggering member 150 moves to the starting position, and the motor 42 is started. While by causing the triggering member 150 to slide to a direction away from the working head, the second contact portion 154 is disengaged from the switch, the triggering member 150 moves to the closing position, and the motor 42 stops working.

The first contact portion 152 is matched with the blocking mechanism, the first contact portion 152 is provided with a chute 156 matched with the blocking mechanism. The chute 156 is obliquely disposed relative to the axis X2 of the drive shaft. A moving direction of the triggering member 150 is disposed in parallel with the axis X2 of the drive shaft. When the triggering member 150 moves, the blocking mechanism is driven to move.

The blocking mechanism comprises a blocking member 158 movably disposed relative to the housing, and the blocking member 158 moves between two positions. The oscillating power tool further comprises a stopping member 160 connected to the adjusting mechanism 104. Specifically, the stopping member 160 can be connected to the transmitting unit 108 or the operating unit 106. In the present embodiment, the stopping member 160 is fixedly connected to the rotary shaft 134 in the transmitting unit 108, and the stopping member 160 comprises a limiting portion and a coupling portion. Wherein when the blocking member 158 is in the first position (referring to FIGS. 10 and 14), the blocking member 158 is abutted against the limiting portion for stopping the adjusting mechanism from driving the supporting member 60 to move for switching of the oscillating angle, the triggering member 150 is allowed to move relative to the housing 30, the triggering member 150 can start or close the motor, and at this point, the oscillating power tool 200 can be switched between the working state and the nonworking state. When the blocking member 158 is in the second position, referring to FIG. 12, the blocking member 158 is slidably matched with the coupling portion, and the adjusting mechanism 104 drives the supporting member 60 to move (referring to FIG. 8, the clamping rod 80 is in the middle position), for switching of the oscillating angle. At this point, the triggering member 150 is stopped from moving relative to the housing 30, and the oscillating power tool 200 is in the nonworking state.

Then referring to FIG. 9, in the present embodiment, the blocking member 158 can be movably contained in the housing 30. Specifically, the blocking member 158 is disposed between the head housing 36 and the enclosure 38, and the displacement of the blocking member 158 in a direction of the axis X2 of the drive shaft is limited.

In order for convenient operation and a more compact structure, the blocking member 158 may be disposed between a fan 161 and the output shaft 32. The fan 161 is driven by the motor 42 and configured to cool the motor 42.

The blocking member 158 is approximately arc-shaped and comprises a touch portion 162 and a blocking portion 164, which are approximately disposed on the two ends of the arc shape. Wherein the touch portion 162 is contained in the chute 156, when the triggering member 150 moves, since the displacement of the blocking member 158 along the direction of the axis X2 of the drive shaft is limited, the triggering member 150 may drive the blocking member 158 to rotate. Such blocking member 158 can rotate around an axis parallel with the axis X2 of the drive shaft. Preferably, the blocking member 158 rotates around the axis X2 of the drive shaft.

The stopping member 160 is fixedly disposed on the rotary shaft 134, and can be driven by the operating unit 106 to perform rotary motion around the rotary axis Z2. Of course, the stopping member 160 can also be disposed on other members of the transmitting unit 108 and on the transmitting unit 108, or disposed between the transmitting unit 108 and the operating unit 106 as long as the stopping member 160 can be driven by the operating unit 110. Therefore, if the stopping member 160 is fixed relative to the housing 30, the operating unit 106 can be stopped from moving.

The stopping member 160 can rotate under driving of the operating unit 106. Preferably, the rotary axis Z2 surrounded by the stopping member 160 is perpendicular to the axis Y of the output shaft. Of course, the rotary axis Z2 can also be perpendicular to the axis X2 of the drive shaft. Preferably, the rotary axis Z2 is perpendicular to a plane defined by the axis X1 of the output shaft and the axis X2 of the drive shaft.

Figure 10:
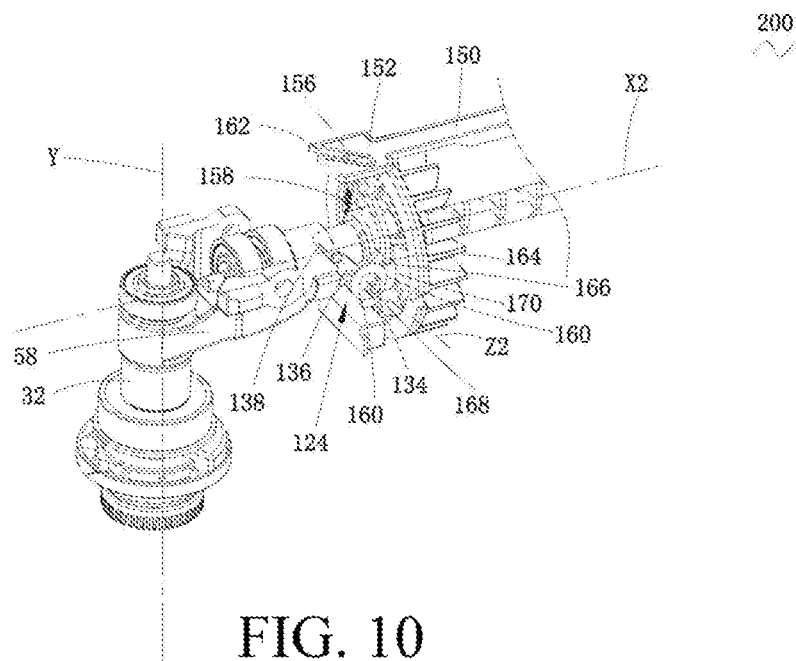
FIG. 10 is a partial schematic view that the oscillating power tool as shown in FIG. 3 is in a first oscillating angle position, and at this point, a triggering member is in a starting position.
Figure 11:
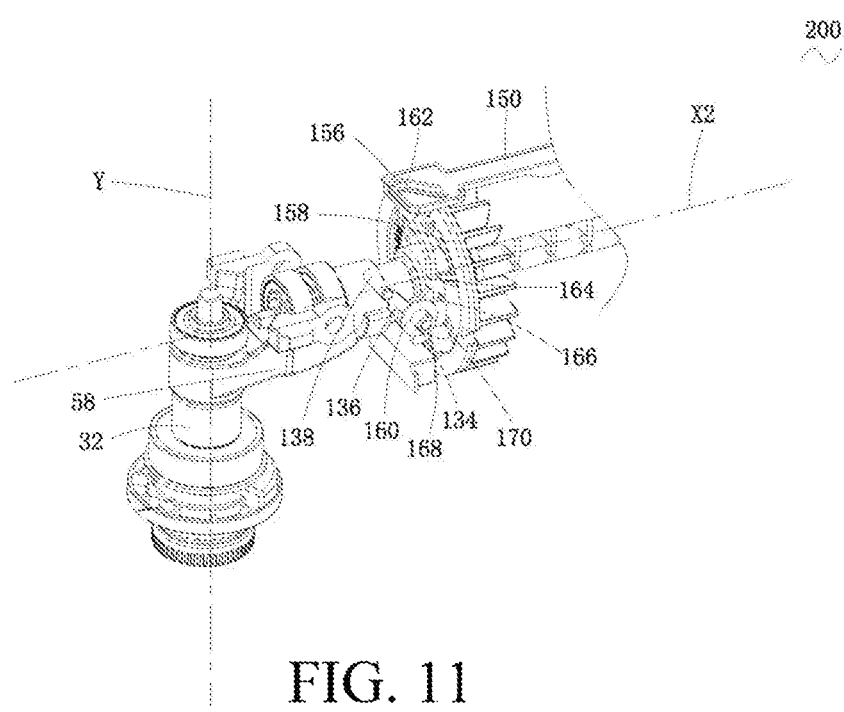
FIG. 11 is a partial schematic view that the oscillating power tool as shown in FIG. 3 is in the first oscillating angle position, and at this point, the triggering member is in a closing position.

In the present embodiment, then referring to FIG. 10, the limiting portion comprises a first limiting portion 166 and a second limiting portion 168 selectively matched with the blocking portion 164. Specifically, the stopping member 160 is provided with the first limiting portion 166 corresponding to the first oscillating angle and the second limiting portion 168 corresponding to the second oscillating angle. A coupling portion 170 is disposed between the first limiting portion 166 and the second limiting portion 168.

Specific shapes of the first limiting portion 166 and the second limiting portion 168 can be set according to that of the blocking portion 164. In the present embodiment, the blocking portion 164 is cylindrical, and then the shapes of the first limiting portion 166 and the second limiting portion 168 are set to be groove-shaped. Besides, when the blocking portion 164 is matched with the first limiting portion 166 or the second limiting portion 168, an extending direction of the groove is parallel with the axis X1 of the output shaft.

The output shaft 32 can output several different oscillating angles, and the amount of the limiting portion can be matched therewith. Of course, if the oscillating angle is any angle, then only one limiting portion may be disposed.

As shown in FIG. 8, when the oscillating power tool 200 is in the first oscillating angle, at this point, the triggering member 150 is in the starting position, the touch portion 162 of the blocking member 158 is contained in the chute 156 in the first contact portion 152 and located on the back end of the chute 156 relatively away from the working head 31. While when the triggering member 150 slides to a direction close to the working head 31, the blocking member 158 is driven to rotate around the axis X2 of the drive shaft, such that the blocking portion 164 is abutted against the first limiting portion 166, and the blocking member 158 is in the first position. In this way, under such state, the stopping member 160 cannot rotate and is fixed relatively, thereby stopping the operating member 110 from moving. Therefore, the triggering member 150 is in the starting position, and since the blocking portion 164 is abutted against the first limiting portion 166, the user cannot move the operating member 110. Therefore, the abutting between the first limiting portion 166 and the blocking portion 164 will limit the moving of the adjusting mechanism 104. That is, the adjusting mechanism is stopped from driving the supporting member 60 to rotate, and the oscillating angle is prevented from being adjusted during startup.

When the oscillating power tool 200 adopts the first oscillating angle to work, halt is needed. At this point, as shown in FIG. 9, the triggering member 150 is only required to slide to a direction away from the working head, and then the motor can be closed. While when the triggering member 150 slides to the direction away from the working head, the blocking member 158 is driven to rotate around the axis X2 of the drive shaft, such that the blocking portion 164 is disengaged from the first limiting portion 166. At this point, the triggering member 150 is in the closing position, the touch portion 162 of the blocking member 158 is contained in the chute 156 in the first contact portion 152, and located on the front end of the chute 156 relatively close to the working head. In such position, the trigging member 150 can start or close the motor. Of course, in the halt state, the blocking portion 164 is disengaged from the first limiting portion 166 on the stopping member 160, then the rotary shaft 134 can be driven by the adjusting mechanism 104 to rotate, such that the clamping rod 138 is promoted to be matched with the supporting member 60 to drive the supporting member 60 to rotate together, and the output shaft 32 is caused to output different oscillating angles.

Figure 12:
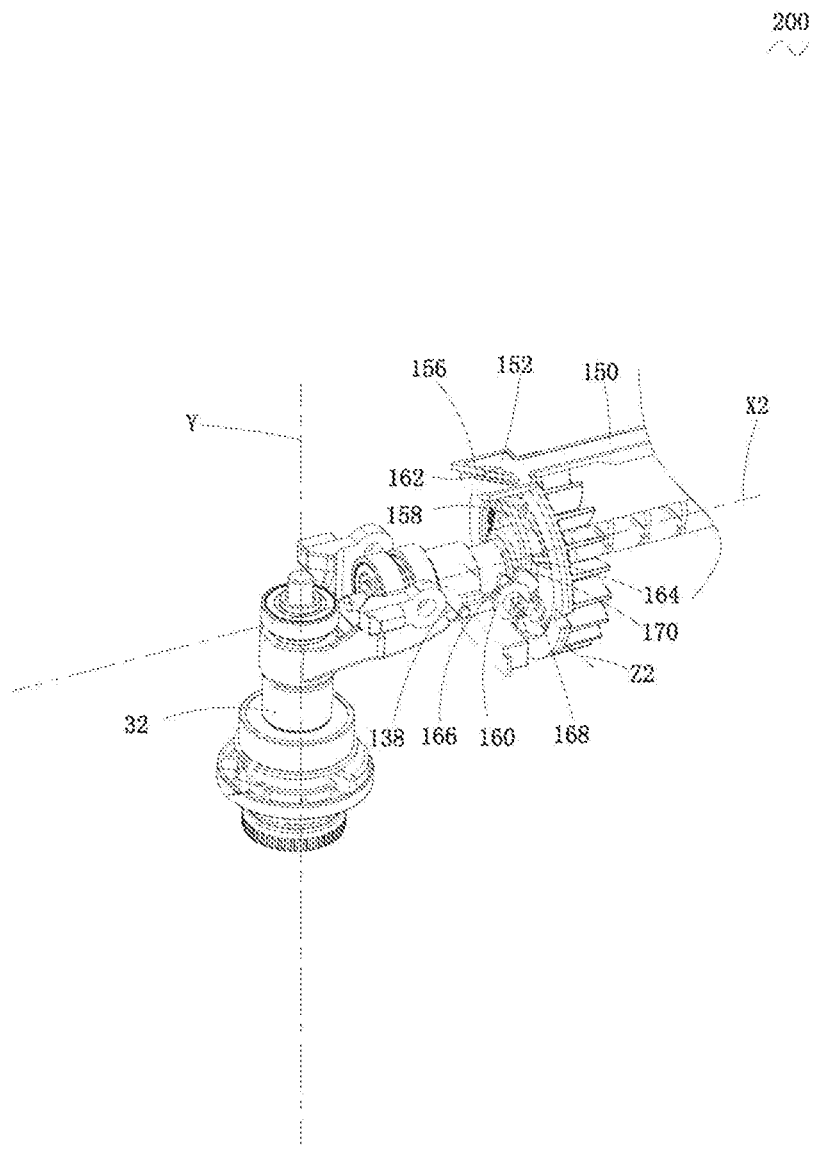
FIG. 12 is a schematic view when the oscillating power tool as shown in FIG. 3 is in an adjusting process of the oscillating angle.

When the user needs to output the second oscillating angle according to actual working conditions, the user firstly slides the triggering member 150 to the closing position, as shown in FIG. 12. In the switching process between the first oscillating angle and the second oscillating angle, at this point, the operating member 110 drives the stopping member 160 to rotate around the rotary axis X2, such that the coupling portion 170 is slidably matched with the blocking portion 164 of the blocking member 158. Therefore, the triggering member 150 is stopped from sliding to a direction close to the working head, that is, the user cannot slide the triggering member 150 to the starting position. The coupling portion 170 is slidably matched with the blocking portion 164 of the blocking member 158, in the present embodiment, the side surface of the blocking member 164 slides on the outer surface of the coupling portion 170, while the outer surface of the coupling portion 170 may be an arc surface taking a point on the rotary axis Z2 as the circle center.

Therefore, in the adjusting process of the adjusting mechanism, if the user tries to convert the triggering member 150 to the starting position from the closing position, that is, start the motor 42, since the blocking member 158 is in the second position, the coupling portion 170 is slidably matched with the blocking portion 164, in such state, the coupling portion 170 will stop the triggering member 150 from moving to a direction of the working head, and the user cannot slide the triggering member 150 to the starting position, thereby ensuring that the oscillating power tool is not started in the process that the user adjusts the oscillating angle.

Figure 13:
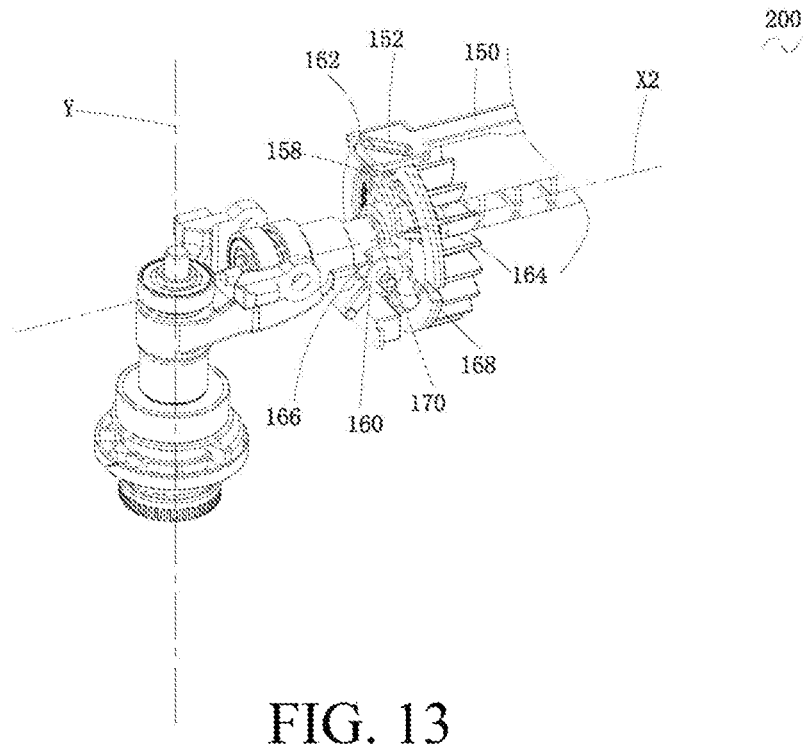
FIG. 13 is a partial schematic view when the oscillating power tool as shown in FIG. 3 is in a second oscillating angle position, and at this point, the triggering member is in the closing position.

While after the user adjusts to the second oscillating angle according to needs, as shown in FIG. 13, at this point, the triggering member 150 is in the closing position. The coupling portion 170 moves to a position separated from the blocking portion 164. In this position, the triggering member 150 may start or close the motor. Of course, the adjusting mechanism 104 may continue adjustment to cause the output shaft 32 to output different oscillating angles.

Figure 14:
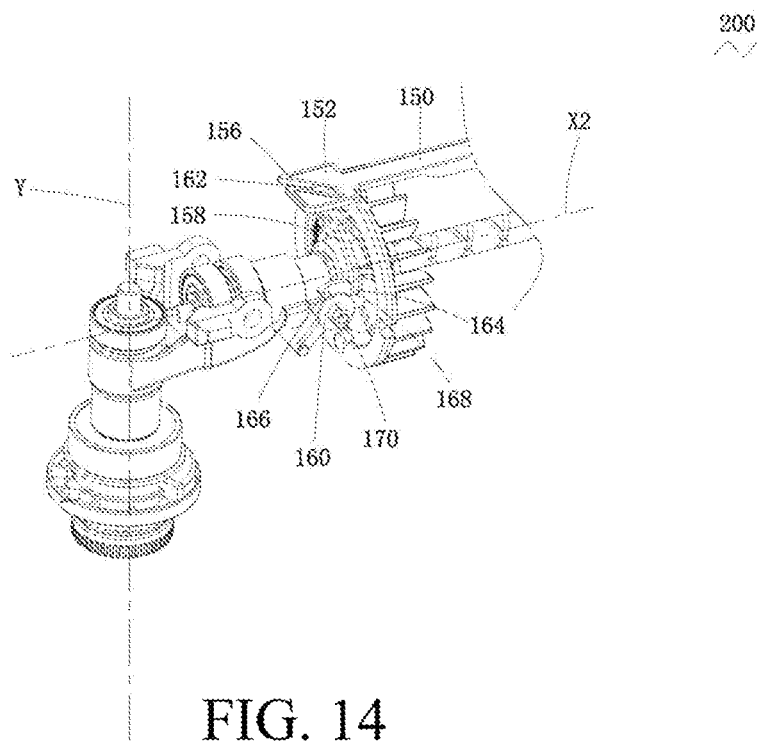
FIG. 14 is a partial schematic view when the oscillating power tool as shown in FIG. 3 is in the second oscillating angle position, and at this point, the triggering member is in the starting position.

When the user needs to adopt the second oscillating angle for working, only the triggering member 150 is required to move to the starting position. As shown in FIG. 14, the triggering member 150 slides to a direction close to the working head, and the blocking member 158 is driven to rotate around the axis X2 of the drive shaft, such that the blocking member 164 is abutted against the second limiting portion 168, and the blocking member 158 is in the first position. While the touch portion 162 of the blocking member 158 is contained in the chute 156 of the first contact portion 152, and located on the back end of the chute 156 relatively away from the working head. Under such state, the stopping member 160 cannot rotate and is relatively fixed, thereby stopping the operating member 110. Therefore, the triggering member 150 is in the starting position, since the blocking portion 164 is abutted against the second limiting portion 168, the user cannot move the operating member. Therefore, the abutting between the second limiting portion 168 and the blocking portion 164 will limit the moving of the adjusting mechanism 104. That is, the operating unit 106 cannot drive the transmitting unit 108 to rotate, such that the adjusting mechanism 104 is stopped from adjusting the supporting member 60 to rotate, and the oscillating angle is prevented from being adjusted during startup.

It can be known from the above description that no matter the oscillating power tool is in the first oscillating angle or the second oscillating angle, that is, the blocking member is in the first position, the triggering member is in a state of triggering the switch to start the motor, the contact portion of the blocking member is connected to the triggering member, and the blocking portion of the blocking member is abutted against the first limiting portion or the second limiting portion, thereby stopping the adjusting mechanism from adjusting the oscillating angle and avoiding the adjustment on the oscillating angle during startup. In the process that the oscillating power tool is switched between the first oscillating angle and the second oscillating angle, the blocking member is in the second position, the contact portion of the blocking member is connected to the triggering member, the blocking portion of the blocking member is slidably matched along the surface of the matching portion, so as to stop the triggering member from triggering the switch to start the motor, thereby ensuring that the oscillating power tool will not be started in the process that the user adjusts the oscillating angle.

The present invention is not limited to the listed specific embodiment structures, and all structures based on the concept of the present invention belong to a protective scope of the present invention.

What is claimed is:

1. An oscillating power tool, comprising:
    a housing;
    a motor accommodated in the housing;
    a drive shaft driven by the motor to perform rotary motion;
    an output shaft driven by the drive shaft to oscillate around an axis per se;
    a transmission mechanism for converting rotary motion of the drive shaft into oscillation of the output shaft, wherein the transmission mechanism comprises an eccentric device mounted on the drive shaft and a shifting fork assembly connecting the eccentric device with the output shaft;
    wherein the eccentric device comprises at least two drive members, the shifting fork assembly comprises a shifting fork member connected to the output shaft and a supporting member movably connected to the shifting fork member, the supporting member comprises two matching portions, the oscillating power tool further comprises an adjusting mechanism disposed in the housing, the adjusting mechanism operably adjusts the supporting member to move, such that the two matching portions are selectively abutted against one of the at least two drive members, thereby adjusting the output shaft to perform in different oscillating angles; and
    wherein the supporting member further comprises a connecting portion connecting the two matching portions, and an anti-rotation mechanism is disposed between the connecting portion and the two matching portions.

2. The oscillating power tool according to claim 1, wherein the at least two drive members comprise a first drive member and a second drive member, in a first position, the two matching portions are abutted against the first drive member, the output shaft performs in a first oscillating angle, and in a second position, the two matching portions are abutted against the second drive member, and the output shaft performs in a second oscillating angle.

3. The oscillating power tool according to claim 2, wherein an eccentric distance from the first drive member to the drive shaft equals to that from the second drive member to the drive shaft.

4. The oscillating power tool according to claim 1, wherein the supporting member is rotatably connected to the shifting fork member around a pivot axis.

5. The oscillating power tool according to claim 4, wherein the shifting fork member comprises a first end connected to the output shaft and a second end disposed opposite to the first end, wherein the supporting member is connected to the second end.

6. The oscillating power tool according to claim 4, wherein the two matching portions comprise a matching surface configured to be selectively engaged with the first drive member and the second drive member.

7. The oscillating power tool according to claim 6, wherein the matching surface is parallel to an axis of the drive shaft, and in the first position, the matching surface is abutted against the first drive member; and in the second position, the matching surface is abutted against the second drive member.

8. The oscillating power tool according to claim 7, wherein a plane passing through the pivot axis and parallel to the axis of the output shaft is defined as a reference plane; and the matching surface penetrates through the reference plane when it rotates between the first position and the second position.

9. The oscillating power tool according to claim 4, wherein the shifting fork member comprises two forklike arms being symmetrically disposed, and the two matching portions being rotatably disposed in the two forklike arms around the pivot axis respectively.

10. The oscillating power tool according to claim 9, wherein the two matching portions are provided with a pivot shaft, and the supporting member is rotatably connected to the shifting fork member by the pivot shaft.

11. The oscillating power tool according to claim 10, wherein a snap spring is connected to the pivot shaft, and an elastic member is disposed between the snap spring and the connecting portion.

12. The oscillating power tool according to claim 4, wherein a retaining mechanism is disposed between the supporting member and the shifting fork member, and the retaining mechanism is configured to retain the supporting member in the first position or the second position relative to the shifting fork member.

13. The oscillating power tool according to claim 4, wherein the adjusting mechanism comprises an operating unit movably connected to the housing and a transmitting unit connected to the operating unit, wherein the transmitting unit is selectively engaged with the supporting member to convert motion of the operating unit into rotation of the supporting member between the first position and the second position.

14. The oscillating power tool according to claim 13, wherein the operating unit comprises an operating member movably connected to the housing.

15. The oscillating power tool according to claim 14, wherein the transmitting unit comprises a transmitting member connected to the operating member, and a rotary assembly connected to the transmitting member, wherein the rotary assembly is rotatably connected to the housing around a rotary axis.

16. The oscillating power tool according to claim 15, wherein the rotary assembly comprises a rotary shaft connected to the transmitting member, a connecting rod connected to the rotary shaft, and a clamping rod disposed at an angle with respect to the connecting rod, and the clamping rod is selectively matched with the supporting member.

17. The oscillating power tool according to claim 16, wherein the oscillating power tool further comprises a blocking member movably disposed relative to the housing and a stopping member disposed on the rotary assembly, and the stopping member comprises a limiting portion and a coupling portion; when the blocking member is abutted against the limiting portion, the adjusting mechanism is stopped from driving the supporting member to move, so that the oscillating power tool is shiftable between a working state and a nonworking state; and when the blocking member is slidably matched with the coupling portion, the adjusting mechanism is permitted to drive the supporting member to move, so that the oscillating power tool is in the nonworking state.

18. The oscillating power tool according to claim 17, wherein the stopping member is disposed on the rotary shaft.

* * * * *